United States Patent [19]
Fuchigama et al.

[11] Patent Number: 5,079,547
[45] Date of Patent: Jan. 7, 1992

[54] METHOD OF ORTHOGONAL TRANSFORM CODING/DECODING

[75] Inventors: Norihiko Fuchigama, Yokohama; Masaya Konishi, Yokosuka; Yasuhiro Yamada, Yokohama, all of Japan

[73] Assignee: Victor Company of Japan, Ltd., Yokohama, Japan

[21] Appl. No.: 661,870

[22] Filed: Feb. 27, 1991

[30] Foreign Application Priority Data

Feb. 28, 1990 [JP] Japan .................................... 2-48106

[51] Int. Cl.$^5$ ............................................. H03M 1/00
[52] U.S. Cl. ......................................... 341/51; 381/36; 375/122; 341/106; 341/155
[58] Field of Search .................... 341/50, 51, 106, 144, 341/155; 375/122; 381/29, 30, 31, 34, 35, 36, 37, 46, 47

[56] References Cited

U.S. PATENT DOCUMENTS

| | | | |
|---|---|---|---|
| 4,476,458 | 10/1984 | Dollard | 341/51 |
| 4,573,187 | 2/1986 | Bui et al. | 381/35 X |
| 4,896,362 | 1/1990 | Veldhuis et al. | 381/30 |
| 4,980,916 | 12/1990 | Zinser | 381/36 |
| 5,007,092 | 4/1991 | Galand et al. | 381/36 |

*Primary Examiner*—Howard L. Williams
*Attorney, Agent, or Firm*—Michael N. Meller

[57] ABSTRACT

There is provided the method of orthogonal transform coding/decoding to quantize/de-quantize transformed coefficients which are divided into a plurality of bands to which respective different numbers of coefficient are allotted. Quantization/de-quantization tables are arranged on the basis of a probability density function of the coefficient values designed on the assumption of a specified number of coefficients so as to correspond to the number of quantization/de-quantization bits. The values in the quantization/de-quantization tables selected according to the number of quantization/de-quantization bits are adaptively compensated on the basis of an actual number of coefficients on each band to quantize/de-quantize the coefficient values.

3 Claims, 7 Drawing Sheets

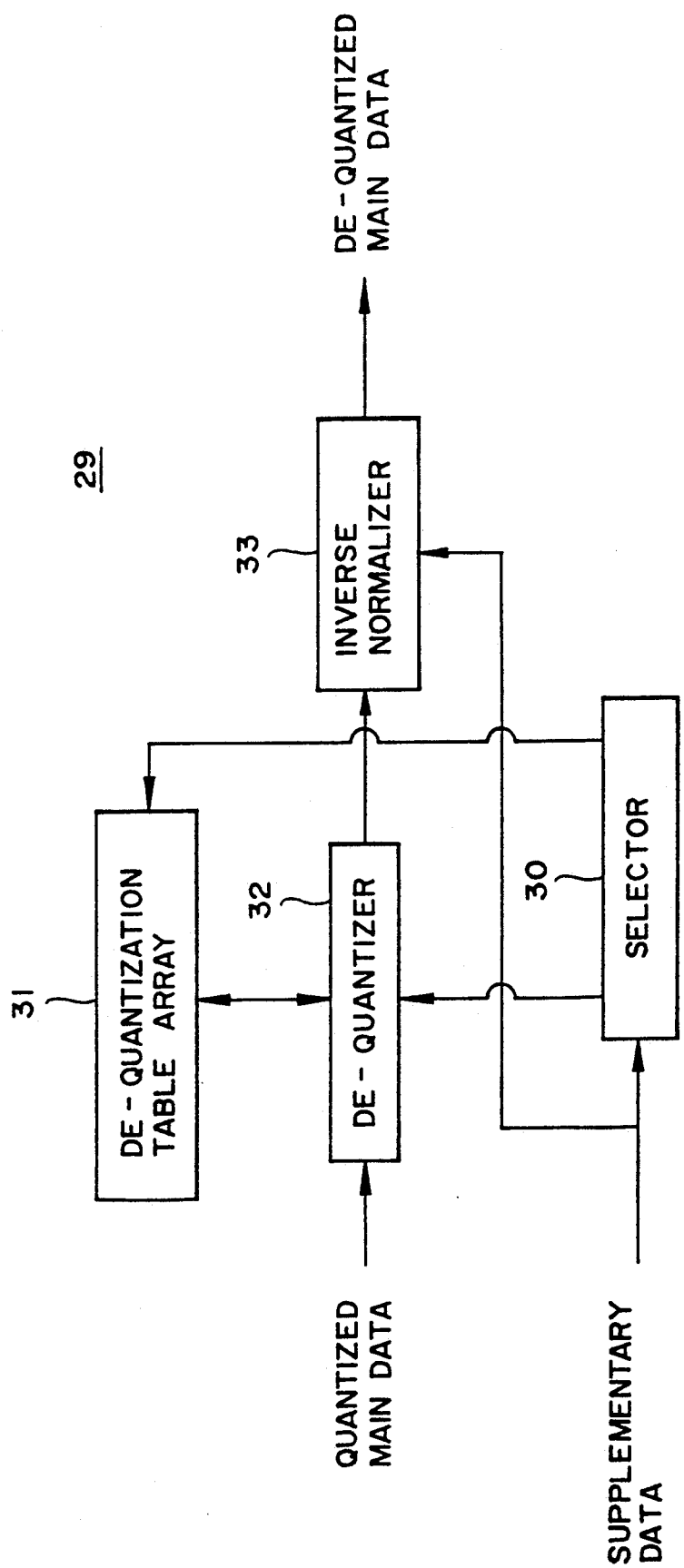

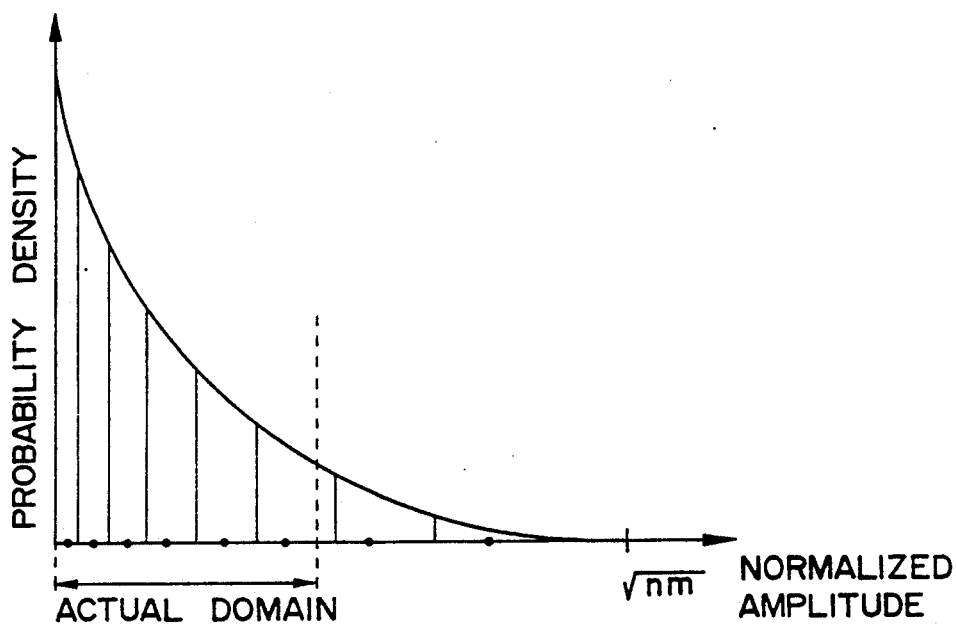
F I G. 5A
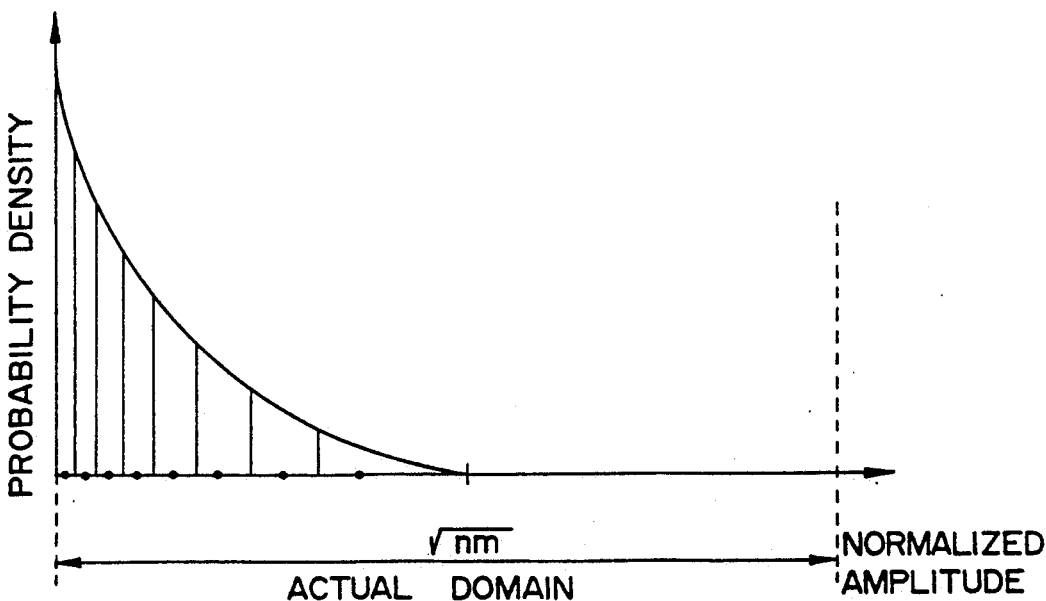
F I G. 5B

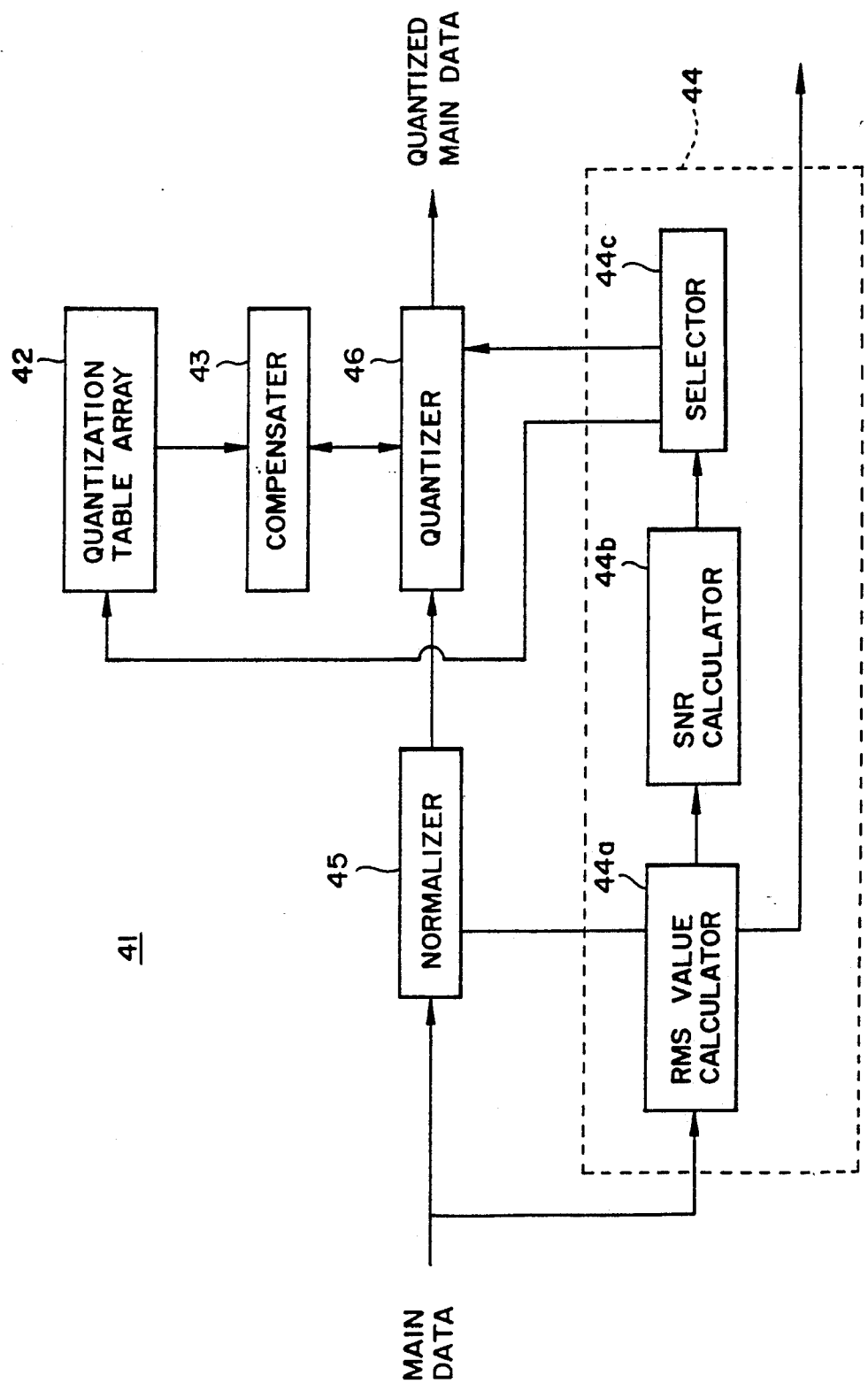
F I G. 6

METHOD OF ORTHOGONAL TRANSFORM CODING/DECODING

BACKGROUND OF THE INVENTION

The present invention relates to a method of orthogonal transform coding/decoding in which transformed coefficients are divided into a plurality of frequency bands, the numbers of coefficients on frequency bands being different from each other, to quantize/de-quantize the coefficients.

FIG. 1 shows a conventional orthogonal transform coding/decoding system which comprises a coding system 10 and a decoding system 17.

In the coding system 10, the data objective to quantization is fed to a front processor 11 and the data thus processed is coded via an orthogonal transformer 12, intermediate processor 13 and a quantizer 14. The data thus quantized is transmitted to the decoding system 17 by a transmitter 15.

More precisely, the data is processed by the front processor 11 with covering a window function. The processed data is transformed by the orthogonal transformer 12 with discrete fourier transformation or discrete cosine transformation.

The frequency band of the transformed data (coefficients) is divided into a plurality of bands by the intermediate processor 13 (sub-band division) The band-divided data is quantized by the quantizer 14.

The number of quantization steps is selected by an additional control processor 16 on the basis of an RMS power (a root-mean-square value), the processor 16 being responsible for other overall adaptive control.

The quantized data and supplementary data are transmitted to the decoding system 17 in the form of a bit stream. The quantized data is decoded via a receiver 18, de-quantizer 19, an intermediate processor 20, inverse orthogonal transformer 21, and a rear processor 22.

The number of de-quantization steps is selected by an additional control processor 23 on the basis of the supplementary data, the processor 23 being responsible for other overall adaptive control.

In such a conventional orthogonal coding/decoding system, effective quantization methods with less distortion of quantized data such as non-uniform quantization, separate quantization in every divided-frequency band and separate quantization in which the number of steps is selected in every frequency band, etc., have been employed.

The above three quantization methods will be explained to start with non-uniform quantization. The probability density function of amplitude of coefficient transformed of an audio or video signal generally exhibits a Laplace or Gauss distribution in which the probability density becomes higher as the amplitude of the coefficient becomes smaller.

In the case of quantization of the transformed coefficients exhibiting those distributions with a constant number of quantization steps, as shown in FIG. 2, a larger number of quantization steps are allotted the region of higher probability density, while a smaller number of steps are allotted for the region of lower probability density to reduce distortion due to quantization (non-uniform quantization). The probability density function and the number of quantization steps are supposed to be an even function and even number respectively in FIG. 2.

An orthogonal coding/decoding system adopting non-uniform quantization is generally designed so as to have the function of minimizing the mean-square error of quantization when the probability density function and the number of quantization steps are supposed Quantization per divided-frequency band is next explained. Transformed coefficients are divided into a plurality of bands and then quantized with the number of steps required for each divided band. The coefficient values should be normalized with an RMS value (a root-mean-square value) on each band.

For example, suppose that the number of coefficients per band is 16. When the coefficient values are normalized with the RMS value on the band, the normalized coefficient values are in the range of 0.0 to $\sqrt{16}=4.0$. This range is to be the domain of definition.

Accordingly, if quantization is to be conducted per block-length (The number of coefficients is 16.), a quantizer is designed under the condition that, for example, $$P(x) = c \cdot e^{-\sqrt{2} x}$$

as the probability density function, where, $$\int_{0.0}^{4.0} P(x)dx = 1$$

and the domain of definition is $0.0 < x < 4.0$.

If the number of coefficients per frequency band is constant, an adequate probability density function is set to design quantizing/de-quantizing systems having quantizing threshold level-tables/de-quantized value-tables corresponding to different numbers of quantization/de-quantization steps.

Quantization/de-quantization is performed by comparing coefficient values/quantized values with quantizing threshold levels/de-quantized values on each number of steps.

Quantization by selecting the number of steps per frequency band is explained. FIGS. 3 and 4 show a quantizing system 24 and de-quantizing system 29 respectively in which the number of quantization/de-quantization steps is selected on the basis of an RMS power (an RMS value).

In the quantizing system 24, the number of quantization steps is selected on the basis of the main data including values on each frequency band in a selector 25. The quantization table corresponding to the selected number of steps is selected from a quantization table array 27.

The coefficient values are normalized with the RMS value in a normalizer 26. Then, the normalized coefficient values are compared with quantization threshold levels in the selected quantization table respectively to quantize the normalized coefficient values in a quantizer 28.

The quantized main data and supplementary data including the data required for decoding are supplied to the de-quantizing system 29 from the quantizer 28 and selector 25.

In the de-quantizing system 29, the number of de-quantization steps is selected in a selector 30 on the basis of the supplementary data.

The de-quantization table corresponding to the selected de-quantization steps is selected from a de-quantization table array 31.

The quantized main data is compared with de-quantized values in the selected de-quantization table to de-quantize the quantized main data in a de-quantizer 32.

The de-quantized main data is inverse-normalized with RMS values in an inverse normalizer 33.

Quantization on divided frequency bands with a variable number of coefficients per band is explained. In the case of orthogonal transform and compression coding of audio signals, it is widely known that the audio signals are effectively processed by dividing the critical band known as auditory characteristics into several bands. The domain of definition of the probability density function varies dependent on band.

The following methods have been known as to quantization method adopting quantization tables in the case where the number of coefficients is variable on each band.

(a) Quantization method with a plurality of quantization tables and de-quantization tables designed according to the different numbers of coefficients for respective bands.

(b) Quantization method covering all bands with a quantization table and de-quantization table designed by supposing the mean number of coefficients.

However, (a) is not realistic because the number of quantization tables is increased as the number of bands is increased.

As to (b), quality of quantized data is greatly deteriorated if the number of coefficients varies largely dependent on band.

As shown in FIG. 5A, if the number of coefficients on a band is smaller than a mean value (assumed value), quantization is performed not with all quantization steps but a few steps corresponding to such a small number of coefficients. While if larger than the mean value, this results in lack of quantization steps which causes a large quantization error in the coefficient having a large amplitude on a band.

As understood from the foregoing, the conventional quantization method adopting quantization/de-quantization tables with a variable number of coefficient per band causes problems in construction and quality of the coding/decoding system.

SUMMARY OF THE INVENTION

The object of the present invention is to provide the method of orthogonal transform coding/decoding to quantize/de-quantize transformed coefficients which are divided into a plurality of bands to which respective different numbers of coefficients are allotted.

Quantization/de-quantization tables designed on the basis of a probability density function of coefficient value on the assumption of a specified number of coefficients are arranged so as to correspond to pre-set plural numbers of quantization/de-quantization bits, respectively.

The values in the quantization/de-quantization tables selected according to the number of quantization/de-quantization bits are adaptively compensated on each band.

According to the present invention there is provided a method of orthogonal transform coding to quantize transformed coefficients which are divided into a plurality of bands to which respective different numbers of coefficients are allotted.

The method comprises the steps of:

arranging a plurality of quantization threshold level-tables designed on the basis of a probability density function of coefficient value on the assumption of a pre-set number of coefficients, the quantization threshold level-tables corresponding to pre-set plural numbers of quantization bits respectively, selecting a table among the quantization threshold level-tables in response to a number of bits by which the quantization of coefficient on a band is to be performed, and compensating the quantization levels in the selected table with the square root of a ratio of the number of coefficients on the band to the pre-set number of coefficients, thus to compare the coefficient values and the compensated threshold levels with each other to quantize the coefficient values.

There is also provided a method of orthogonal transform decoding to de-quantize quantized values of transformed coefficients which are divided into a plurality of bands to which respective different numbers of coefficients are allotted.

The method comprises the steps of:

arranging a plurality of de-quantized value-tables designed on the basis of a probability density function of coefficient value on the assumption of a pre-set number of coefficients, the de-quantized value-tables corresponding to pre-set plural numbers of de-quantization bits, selecting a table among the de-quantized value-tables in response to a number of bits by which the quantization of coefficients on a band was performed, and compensating the de-quantized values in the selected table with the square root of a ratio of the number of coefficients on the band to the pre-set number of coefficients, the de-quantized values corresponding to the quantized values of coefficients on the band.

Accordingly, in quantization/de-quantization on each frequency band, the range of the values in the quantization/de-quantization tables is compensated so as to be adjusted to the actual domain of definition of the probability density function on each band due to the number of coefficients on the band.

Therefore, the present invention is advantageous in that, a quantization/de-quantization table per number of quantization/de-quantization bits can be adopted to quantization/de-quantization on frequency bands to which respective different numbers of coefficients are allotted.

Furthermore, the error due to a difference of a number of coefficients is greatly reduced so that quantization/de-quantization of low distortion can be realized with a simple construction.

The other objects and features of the present invention will be understood from the following description with reference to the accompanying drawings.

BRIEF DESCRIPTION OF THE DRAWINGS

FIG. 4 is a diagram of a conventional dequantization system;

FIGS. 5A and 5B are graphs for explaining problems arising in the case of a number of transformed coefficients on a frequency band being different from the number of coefficients set when a quantizer is designed;

FIG. 6 is a diagram of a preferred embodiment of a quantization system adopting a method of orthogonal transform coding according to the present invention.

DESCRIPTION OF THE PREFERRED EMBODIMENTS

Figure 1:
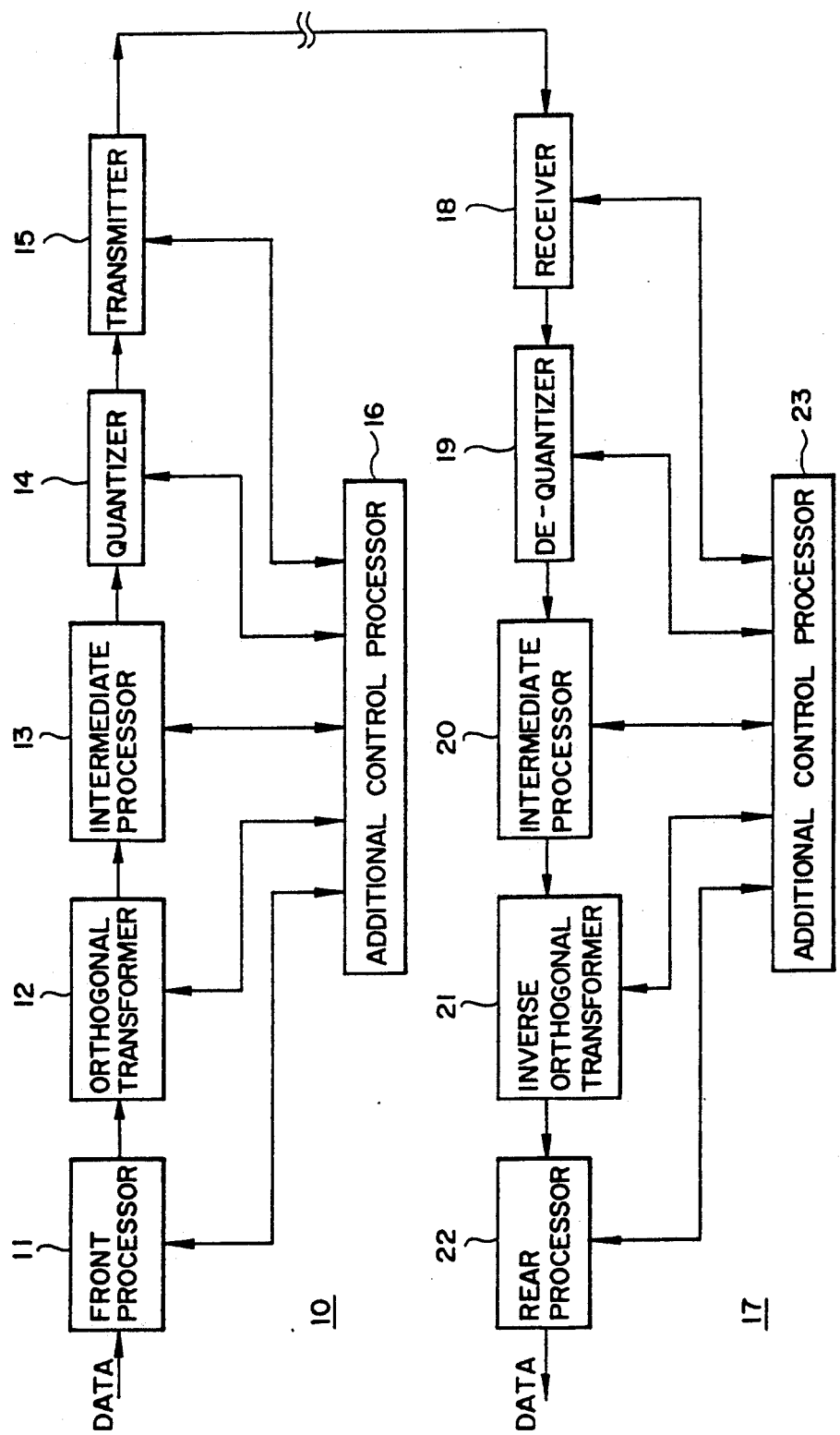
FIG. 1 is a diagram of a conventional orthogonal transform coding/decoding system.
Figure 2:
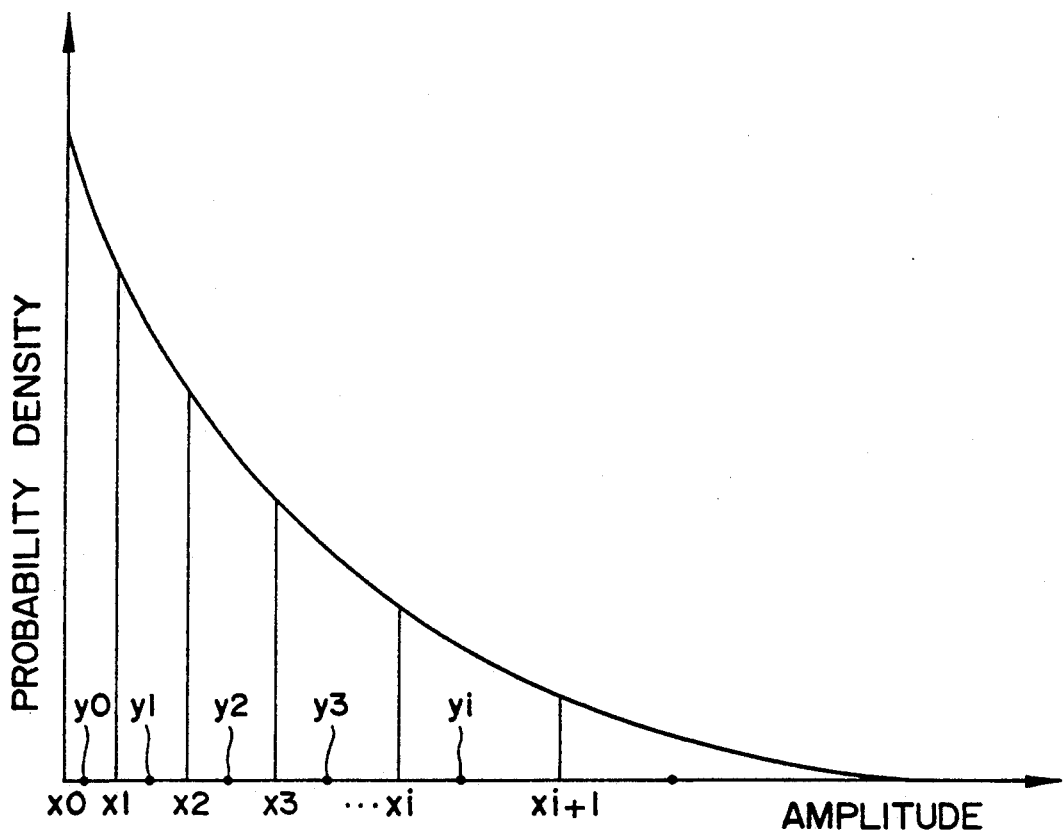
FIG. 2 is a graph for explaining non-uniform quantization.
Figure 3:
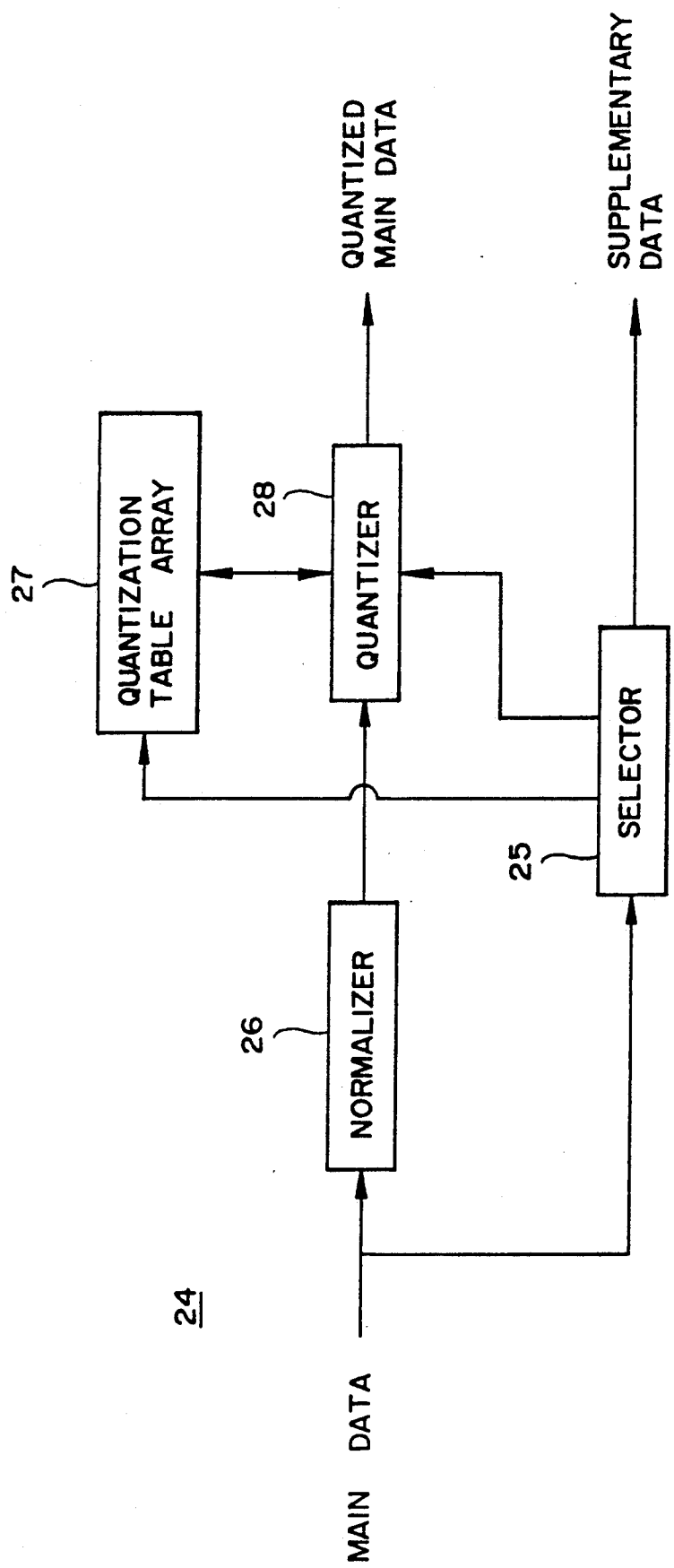
FIG. 3 is a diagram of a conventional quantization system.

The present invention will be described in detail with reference to the accompanying drawings.

First in FIG. 6, a coding system 41 comprises a normalizer 45, quantization table array 42, compensater 43, quantizer 46 and an additional control processor 44. The processor 44 further comprises an RMS value calculator 44a, SNR calculator 44b and a selector 44c.

Figure 7:
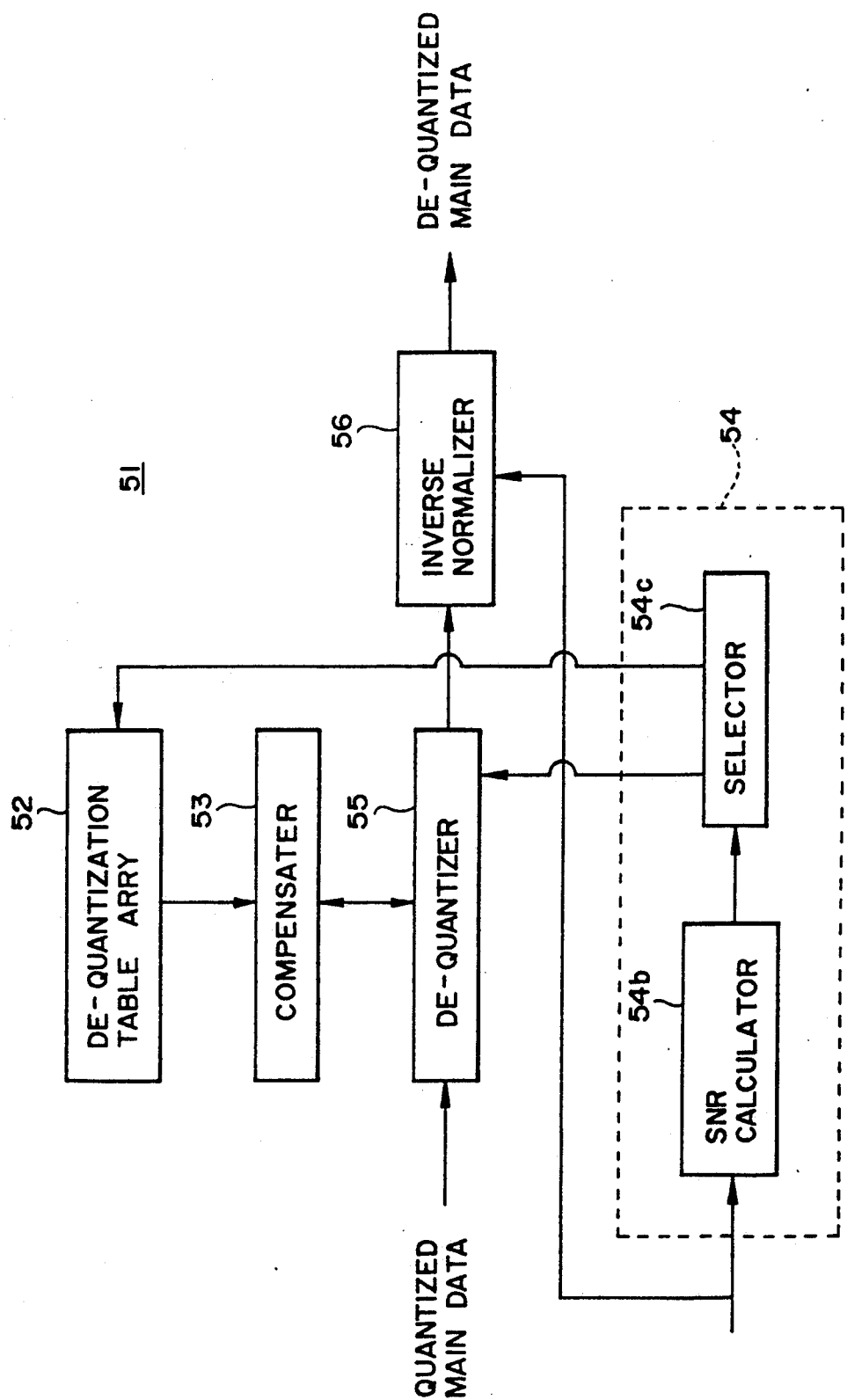
FIG. 7 is a diagram of a preferred embodiment of a de-quantization system adopting a method of orthogonal transform decoding according to the present invention.

Next in FIG. 7, a decoding system 51 comprises a de-quantization table array 52, compensater 53, de-quantizer 55, inverse normalizer 56 and an additional control processor 54. The processor 54 further comprises an SNR calculator 54b and selector 54c.

The quantization table array 42 of the quantization system 41 and the de-quantization table array 52 of the de-quantization system 51 are explained first.

A quantization table is designed per number of quantization steps according to a probability density function of transformed coefficient under a specific number of coefficients. A de-quantization table is also designed per number of de-quantization steps in the same manner.

In detail, the orthogonally-transformed coefficients are divided into "B" bands each having a number of coefficients "$n_i$" (i=1, 2, ..., B).

A number "$n_m$" which is approximately equal to the mean value of the numbers of the coefficients "$n_i$" is adopted as an assumed value to suppose the probability density function (domain of definition [0, $\sqrt{n_m}$]) to design the same number of the quantization tables having quantization threshold levels and de-quantization tables having de-quantized values (representative values) corresponding to the number of quantization and de-quantization steps (which corresponds in turn to a number of quantization bits). The quantization table array 42 and de-quantization table array 52 consist of the quantization tables and de-quantization tables, respectively.

It is supposed that a quantization threshold level in the quantization table corresponding to the number of quantization bits "b" is "$xb_j$" (j=0, ..., $2^{b-1}-1$) and a de-quantized value in the de-quantization table also corresponding to the number of bits "b" is "$yd_j$" (j=0, ..., $2^{b-1}-1$). It is also supposed that the probability density function is an even function.

Further, only positive component of the coefficients are only considered and 1 bit from among "b" bits is assigned to the positive/negative sign.

Next, the compensater 43 and additional control processor 44 of the quantization system 41 and also the compensater 53 and additional control processor 54 of the quantization system 51 are explained.

A noise-masking threshold level is calculated in the SNR calculator 44b on the basis of the RMS values of the coefficients on each band. The ratio of the calculated noise-masking threshold level and RMS value on each band is also calculated as SNR (signal-to-noise ratio) in the SNR calculator 44b.

The number of quantization bits "b" is selected in the selector 44c among plural numbers of bits arranged therein on the basis of the calculated SNR. Then, the quantization table corresponding to the number of bits "b" is selected from the quantization table array 42.

The quantization threshold levels in the selected quantization table are compensated so as to correspond with the number of coefficients "$n_i$".

More specifically, based on the value "$\sqrt{n_m}$" pre-set in the compensater 43, each quantization threshold level in the selected quantization table is multiplied by a compensation factor $$\text{factor} = \sqrt{n_i} / \sqrt{n_m}$$

so as to make the domain of definition [0, $\sqrt{n_m}$] of the assumed probability density function correspond to the actual domain of definition [0, $\sqrt{n_i}$] of the probability density function on each band.

It is supposed that the compensated quantization threshold level is "$xb_j'$".

$$xb_j' = xb_j \times \text{factor}$$
$$= xb_j \times \sqrt{n_i} / \sqrt{n_m}$$

Next, each coefficient value and the compensated quantization threshold level "$xb_j'$" are compared with each other. If $$xb_j' < \text{a coefficient value} < xb_{j+1}',$$

then the quantized value is "j".

Next in the decoding system 51, the number of de-quantization bits is selected in the selector 54c via the SNR calculator 54b on the basis of the RMS value on each band transferred from the coding system 41 in the same manner with the additional control compressor 44.

A de-quantized value "$yb_j$" in a selected de-quantizing table in the de-quantizing table array 52, corresponding to the selected number of de-quantization bits is compensated in the same manner with the above, that is, $$yb_j' = yb_j \times \text{factor}$$
$$= yb_j \times \sqrt{n_i} / \sqrt{n_m}$$

The compensated de-quantized value "$yb_j'$" is selected as the de quantized value by referring to the selected de-quantizing table on the basis of the quantized value "j" in the de-quantizer 55. The de-quantized value "$yb_j'$" is inverse-normalized in the inverse normalizer 56.

Next, in orthogonal transformation and compression of audio signals, a selection method of the number of quantization bits in the case of adopting the critical band of auditory characteristics to be divided is explained. It is supposed that the number of bands is 24.

The following selection method is performed by the RMS value calculator 44a, SNR calculator 44b and selector 44c of the additional control processor 44 of the coding system 41.

(a) Total power P(i) of the coefficient values on each band is calculated. (i = 1, ..., 24)

$$P(i) = \sum_{j=li}^{ui} x(j)^2$$

where, "li" is the first coefficient number on a band "i", "ui" the last, and "x(j)" is the coefficient value on the coefficient number "j".

(b) Convolution S(i) of the total power P(i) and the spreading function B(i) defined by $$10 \log_{10}B(i) = 15.81 + 7.5(i+0.474) - 17.5(1+(i+0.474)^2)^{\frac{1}{2}} [dB]$$

is made. That is, $$S(i) = P(i) * B(i)$$

(c) Noise-masking threshold level Th(i) on each band is obtained by $$10 \log_{10} Th(i) = 10 \log_{10} S(i) - (A + Bi) - D(i)$$

where, A and B are constants and D(i) is the convolution gain.

(d) SNR (signal-to-noise ratio) on each band SNR(i) is obtained.

$$SNR(i) = 10 \log_{10}(P(i)/Th(i)) [dB]$$

(e) The number of quantization bits on each band is then selected in the selector 44c by referring to the SNR value pre-set in the selector 44c on the basis of the SNR value SNR(i).

An experiment on sound-adaptive orthogonal transform coding to which the present invention had been applied was made.

the length of orthogonal transformation is 1024 and the frequency band of the sound is ranged from 0 to 24 Hz. The transformed coefficients were divided into 24 bands and the number of coefficients on each band is as shown in TABLE 1. The frequency becomes higher as the band is higher numbered.

TABLE 1

| BAND NO. | NUMBER OF COEFFICIENTS |
|---|---|
| 1 | 6 |
| 2 | 6 |
| 3 | 5 |
| 4 | 5 |
| 5 | 5 |
| 6 | 6 |
| 7 | 7 |
| 8 | 7 |
| 9 | 8 |
| 10 | 9 |
| 11 | 10 |
| 12 | 12 |
| 13 | 13 |
| 14 | 17 |
| 15 | 19 |
| 16 | 23 |
| 17 | 30 |
| 18 | 39 |
| 19 | 47 |
| 20 | 55 |
| 21 | 75 |
| 22 | 107 |

TABLE 1-continued

| BAND NO. | NUMBER OF COEFFICIENTS |
|---|---|
| 23 | 149 |
| 24 | 364 |

It is supposed that "$n_m$" = 16. Then, the segmental SNR value for respective frequency bands of the decoded sound were calculated in the cases where
factor = 1.0
that is, non-compensation was made and
factor = $\sqrt{n_i}/\sqrt{n_m} = \sqrt{n_i}/4.0$
that is, compensation was made.
The calculated values are shown in TABLE 2.

TABLE 2

| FREQUENCY BAND [Hz] | SEGMENTAL SNR [dB] | | | |
|---|---|---|---|---|
| | A | B | A' | B' |
| 0 TO 400 | 39.5 | 42.5 | 27.5 | 30.3 |
| 400 TO 770 | 28.3 | 31.1 | 18.0 | 22.9 |
| 770 TO 1290 | 28.0 | 28.3 | 16.0 | 18.6 |
| 1290 TO 2020 | 20.2 | 21.3 | 19.7 | 21.2 |
| 2020 TO 3160 | 18.8 | 18.7 | 15.9 | 15.4 |
| 3160 TO 5320 | 16.3 | 18.0 | 13.0 | 16.1 |
| 5320 TO 9470 | 7.5 | 11.0 | 7.0 | 9.4 |
| 9470 TO 20000 | 3.8 | 6.6 | 6.6 | 8.2 |

The music adopted to the experiment were triangle solo (A; non-compensation made and B; compensation made) and glockenspiel solo (A'; non-compensation made and B'; compensation made).

As is obvious from TABLE 2, the SNR values were improved in almost all frequency bands when the compensation was made.

While the presently preferred embodiment of the present invention has been shown and described, it is to be understood this disclosure is for the purpose of illustration and that various changes and modifications may be made without departing from the scope of the invention as set forth in the appended claims.

What is claimed is:

1. A method of orthogonal transform coding to quantize transformed coefficients which are divided into a plurality of bands to which respective different numbers of coefficients are allotted, comprising the steps of:

arranging a plurality of quantization threshold level-tables designed on the basis of a probability density function of coefficient value on the assumption of a pre set number of coefficients, the quantization threshold level-tables corresponding to pre-set plural numbers of quantization bits respectively, selecting a table among the quantization threshold level-tables in response to a number of bits which the quantization of coefficients on a band is to be performed, and compensating the quantization levels in the selected table with the square root of a ratio of the number of coefficients on tee band to the pre-set number of coefficients, thus to compare the coefficient values and the compensated threshold levels with each other to quantize the coefficient values.

2. The method according to claim 1, wherein the step of selecting the table is performed on the basis of calculating a signal-to-noise ratio defined by a ratio of the root-mean-square value of the coefficients on the band to a noise-masking threshold level.

3. A method of orthogonal transform decoding to de-quantize quantized values of transformed coefficients which are divided into a plurality of bands to which respective different number of coefficients are allotted, comprising the steps of:

arranging a plurality of de-quantized value-tables designed on the basis of a probability density function of coefficient value on the assumption of a pre-set number of coefficients, the de-quantized value-tables corresponding to pre-set plural numbers of de-quantization bits, and the steps being the same as each other, selecting a table among the de-quantized value-tables in response to a number of bits by which the quantization of coefficients on a band was performed, and compensating the de-quantized values in the selected table with the square root of a ratio of the number of coefficients on the band to the pre-set number of coefficients, the de-quantized values corresponding to the quantized values of coefficients on the band.

* * * * *